March 16, 1954 E. W. JOHNSON ET AL 2,672,471
PROCESS FOR MAKING ORGANO-TIN HALIDES
Filed Nov. 28, 1951
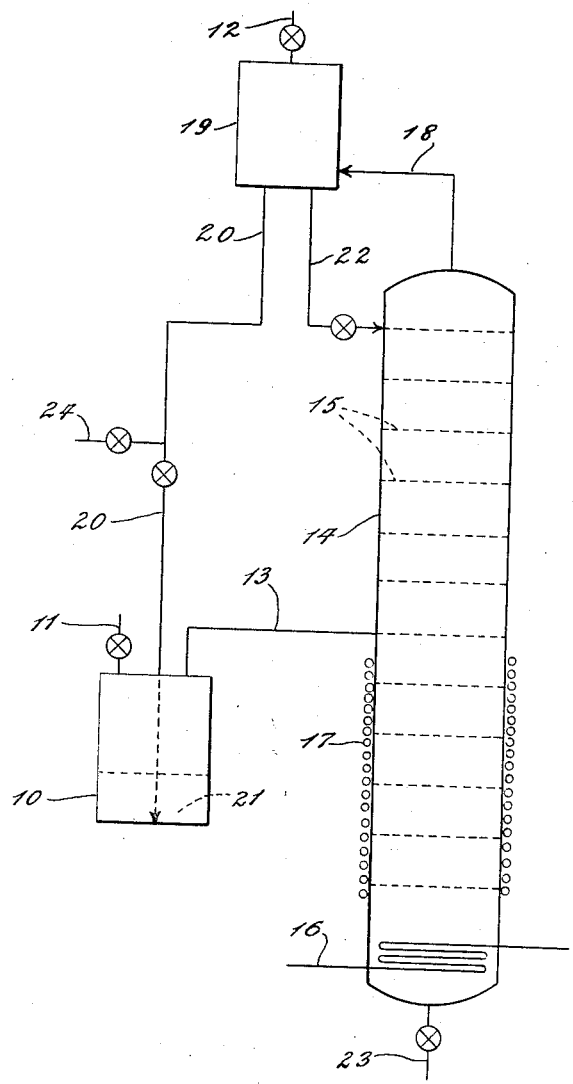
INVENTORS
Ernest W. Johnson
and
BY James M. Church
Burgess, Ryan & Hicks
ATTORNEYS Patented Mar. 16, 1954

2,672,471

UNITED STATES PATENT OFFICE 2,672,471

PROCESS FOR MAKING ORGANO-TIN HALIDES

Ernest W. Johnson, Mountainside, and James M. Church, Tenafly, N. J., assignors to Metal & Thermit Corporation, New York, N. Y., a corporation of New Jersey Application November 28, 1951, Serial No. 258,572

4 Claims. (Cl. 260—429)

This invention relates to processes for making organo-tin compounds in which the organo portion of the compounds comprises an alkyl radical. More particularly, it relates to processes for making organo-tin compounds and continuously separating a desired compound as it is formed.

An object of the invention is to provide a process in which a mixture of organo-tin mono- and trihalides is subjected to treatment according to which the mono- and trihalides may be converted to form the dihalide and the latter continuously and coincidently separated. If desired, the various halides may be separately recovered. The mixture, which originally may or may not contain the dihalide, may be obtained from any source, but preferably is formed as hereinafter described. Other objects and advantages will be apparent hereinafter.

Generally speaking, the invention comprises a process for making tin hydrocarbon compounds of the type: $R_2SnCl_2$, in which R is an alkyl radical having from four to six carbon atoms, inclusive, Sn is tin, and Cl is chloride, which comprises: heating a mixture comprising $RSnCl_3$ and $R_3SnCl$ to produce $R_2SnCl_2$, placing the reaction mixture under subatmospheric pressure, continuing the heating to distill the dichloride and any more volatile material, collecting the distillate, separating more volatile material from the dichloride and returning the more volatile material to the reaction mixture. The dichloride may be separated from the more volatile derivative by distillation and the latter returned to the reaction mixture. The mono- and trichlorides are converted to form additional amounts of dichloride by heating the two together, and in this step the dichloride coincidently distills out of the reaction mixture as it is formed.

The invention above described further comprises the process of forming a mixture of the mono-, di-, and trichlorides by heating $R_4Sn$ with $SnCl_4$, in which R and Cl are the same as before, to produce a mixture of $R_2SnCl_2$, $RSnCl_3$ and $R_3SnCl$, placing the mixture under subatmospheric pressure, and proceeding as above described.

Referring in detail to the invention, the alkyl tin starting material, $R_4Sn$, for preparing the organo-tin chlorides may include tin alkyls such as tetra-n-butyl tin, tetraisobutyl tin, tetra-n-amyl tin, tetraisoamyl tin, and tetra-n-hexyl tin.

The alkyl tin compound and the tin tetrachloride are mixed in a molar ratio of about 1 to 1, preferably in a reactor, to produce a liquid mass, the mixture being warmed, if necessary, to liquefy the reactants. The mixture is heated in the range of about 175 to about 225° C., at which temperature the reaction proceeds, and then it is immediately placed under a suitable subatmospheric pressure sufficient to permit the alkyl tin dichloride to distill out along with more volatile material such as the trichloride. The monochloride is left in the reaction mixture. In this connection, the reaction may be carried out at temperatures as low as about 135° C.

The di- and trichlorides may be collected and fractionated under reduced pressure, the trichloride being lower boiling and distilling out, leaving the dichloride as bottoms. The trichloride is returned to the reactor and heated with the monochloride, the two compounds undergoing conversion, or redistribution, to the dichloride. As additional dichloride is formed, it distills out, along with the trichloride, and is continuously collected and fractionated as described. The redistribution reaction takes place at the distilling temperature of the di- and trichlorides, the distillation being carried out at reduced pressure.

The foregoing process for making the chloride compounds may be, and preferably is, run continuously, as described, although it may also be carried out in stages. If a stagewise method is used, the initial reactants, i. e., $R_4Sn$ and $SnCl_4$, are not placed under vacuum until they have substantially completely reacted to form the mixed alkyl tin chlorides. Then while the reaction mixture is still hot, a vacuum may be applied and the process completed as described.

The invention may be illustrated in connection with the preparation of dibutyl tin dichloride, suitable apparatus for carrying out the process being diagrammatically shown in the drawing. One mol each of tetrabutyl tin and stannic chloride are mixed and the liquid mass charged to reactor 10 via line 11. The reactor is provided with suitable heating means for heating the reactants to initiate the reaction. The mixture is then placed under vacuum by connecting line 12 to a suitable source of low pressure. Heating of reactor 10 is continued. The amount of vacuum to be applied is variable, a suitable value being about 10 mm., at which pressure the distilling temperature for the mixture in reactor 10 will be in the range of 135–140° C. As the reaction proceeds, butyl tin trichloride, dibutyl tin dichloride, and tributyl tin chloride are formed. Butyl tin trichloride, which boils at about 93° C. at 10 mm., and dibutyl tin dichloride, which boils at about 135° C. at 10 mm., distill out of the reactor as they are formed and are removed through line 13 and delivered to a fractionator 14, wherein they are separated. The tributyl tin chloride remains in the reactor 10. Fractionator 14 may be provided with conventional trays or bubble plates 15 and also with suitable pot heating means diagrammatically represented at 16, which may be electrical or which may comprise a heat exchange medium. Suitable reboiling means are also provided, such as the electrically heated resistance winding 17. The butyl tin trichloride, which is lower boiling, is taken overhead in the column 14 and delivered through line 18 to a condenser 19, where it is condensed and then passed through line 20 to reactor 10. As shown, line 20 extends below the surface of the liquid 21 in reactor 10. A portion of the trichloride may be returned to the column through line 22 to serve as reflux.

The butyl tin trichloride and the tributyl tin chloride, when heated together, form or redistribute to dibutyl tin dichloride. The latter must not be allowed to accumulate or else the redistribution reaction will stop. Accordingly, by removing the dichloride as it is formed, and by returning the trichloride, the redistribution reaction proceeds until all of the mono- and trichloride are converted to the dichloride, which accumulates in fractionator 14 and may be removed therefrom through line 23. The invention thus involves the coincident formation and separation of the desired dichloride product. Yields of substantially pure dichloride of over 90% may be obtained.

If the foregoing process is performed stagewise, the tetrabutyl tin and stannic chloride reactants are heated at about 200° C. at atmospheric or subatmospheric pressure until their conversion to the mixed butyl tin chlorides is complete. One or two hours may be required for this stage of the process. Then the reaction mixture, while still hot, is placed under a vacuum of about 10 mm. to initiate the second stage. Heating of the mixture is continued to maintain it at about 200° C., and the remainder of the process is performed as described above.

Instead of starting with R4Sn and SnCl4 to produce the dihalide, a mixture of RSnCl3, R2SnCl2, and R3SnCl may be used, as will be apparent. Also, as indicated above, RSnCl3 and R3SnCl may be heated together to form R2SnCl2, which may be distilled out as formed in the manner described.

If desired, the mixed alkyl tin chlorides formed from the R4Sn and SnCl4 starting materials may be separated and collected. In this case the di- and trichlorides are distilled from the monochloride, then fractionated as before, but instead of returning the trichloride to the monochloride it is collected, for example by removing it through line 24.

While the invention has been described in connection with selected embodiments thereof, it will be appreciated that it is capable of obvious variations without departing from its scope.

This application is a continuation-in-part of copending application, Serial No. 16,698, filed March 24, 1948, Patent No. 2,599,577, issued June 10, 1952.

In the light of the foregoing description, the following is claimed:

1. Process for making dibutyl tin dichloride which comprises: heating to a temperature in the range of about 135 to about 225° C. a mixture comprising butyl tin trichloride and tributyl tin chloride to produce dibutyl tin dichloride, reducing the pressure on the reaction mixture, maintaining the temperature in said range to continuously form the dichloride and to coincidently distill said dichloride as formed, said trichloride also distilling with the dichloride, collecting the distillate and heating it to distill off the trichloride from the dichloride, recovering the latter and returning the trichloride to the reaction mixture to react with tributyl tin chloride to form additional quantities of the dichloride.

2. Process for making dibutyl tin dichloride which comprises: heating tetrabutyl tin with tin tetrachloride to a temperature in the range of about 135 to about 225° C. to produce a mixture comprising dibutyl tin dichloride, butyl tin trichloride, and tributyl tin chloride, reducing the pressure on said mixture, continuing the heating to maintain the temperature in said range, thereby coincidently distilling the dichloride and the trichloride from the mixture, collecting and heating said dichloride and trichloride to distill the latter from the dichloride, and returning the trichloride to said mixture to react with tributyl tin chloride to form additional quantities of the dichloride.

3. Process for making dialkyl tin dichloride in which said alkyl radical has from four to six carbons, inclusive, which comprises: heating a mixture comprising alkyl tin trichloride and trialkyl tin chloride to produce dialkyl tin dichloride, reducing the pressure on the reaction mixture, continuing the heating to coincidently distill said dichloride and said trichloride, collecting the distillate and heating it to distill off the trichloride from the dichloride, and returning the trichloride to the reaction mixture to react with trialkyl tin chloride to form additional quantities of the dichloride, all of the foregoing alkyl radicals having from four to six carbon atoms, inclusive.

4. Process for making dialkyl tin dichloride in which said alkyl radical has from four to six carbons, inclusive, which comprises: heating tetraalkyl tin with tin tetrachloride to produce a mixture comprising dialkyl tin dichloride, alkyl tin trichloride, and trialkyl tin chloride, reducing the pressure on said mixture, continuing the heating to coincidently distill the dichloride and the trichloride from the mixture, collecting and heating said dichloride and trichloride to distill the latter from the dichloride, and returning the trichloride to said mixture to react with trialkyl tin chloride to form additional quantities of the dichloride, all of the foregoing alkyl radicals having from four to six carbon atoms, inclusive.

ERNEST W. JOHNSON.
JAMES M. CHURCH.

References Cited in the file of this patent

Kozeschkow, Ber., vol. 66, 1933.
Jones et al., Chem. Soc. Jour., 1947, Part 11, page 1450.